May 28, 1940.  A. W. FELGER  2,202,249
MIXING VALVE
Filed Nov. 29, 1938

Alfred Wayne Felger
INVENTOR
BY Victor J. Evans & Co.
ATTORNEYS

Patented May 28, 1940

2,202,249

UNITED STATES PATENT OFFICE 2,202,249

MIXING VALVE

Alfred Wayne Felger, Greensburg, Pa.

Application November 29, 1938, Serial No. 243,021

1 Claim. (Cl. 277—18)

My invention relates to improvements in valves and more particularly to a valve whereby the supply of hot and cold water may be selectively controlled.

An important object of my invention is to provide a valve that will more accurately control the issuance of water therefrom at a desired temperature.

Another object of my invention is to provide a manually controlled valve wherein the water pressure from the supply pipes will actuate the plunger valves used in accordance with my device.

Yet another object of my invention is to provide a valve that will accurately control the temperature of the water issuing therefrom, eliminating the necessity of manually feeling the water to ascertain its temperature.

Yet another object of my invention is to provide a valve that is neat in appearance, and simple to install.

Yet another object of my invention is to provide a valve that is simple in construction, efficient in operation, and inexpensive to manufacture.

Other objects and advantages of my invention will be apparent during the course of the following description.

Figure 1:
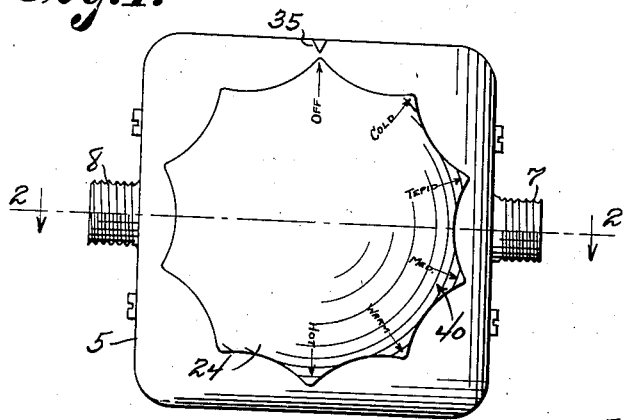
Figure 3:
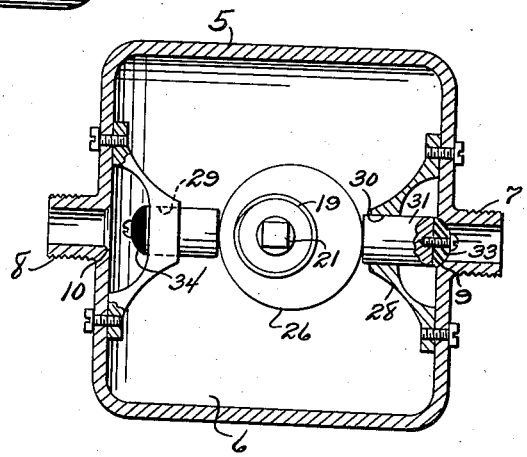
Figure 2:
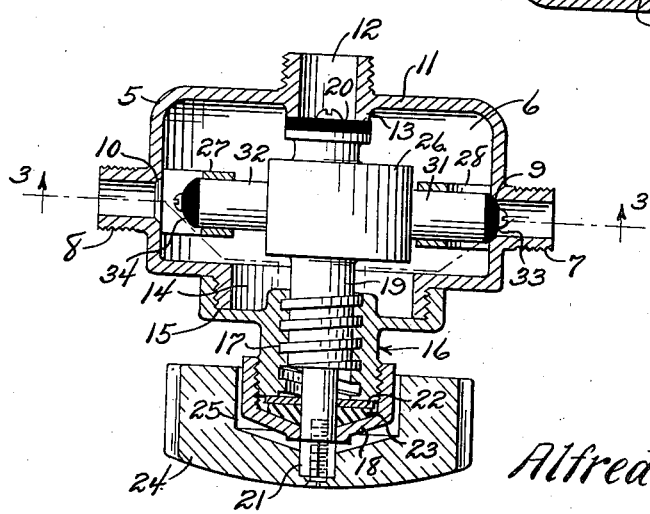

In the accompanying drawing, forming a part of this specification, and in which like numerals are employed to designate like parts throughout the same, Figure 1 is a front elevation of a device embodying my invention, Figure 2 is a vertical sectional view, partly in elevation, taken on the line 2—2 of Figure 1, and Figure 3 is a transverse sectional view taken on the line 3—3 of Figure 2.

In the drawing, wherein for the purpose of illustration is shown a preferred embodiment of my invention, the numeral 5 designates a valve casing provided with an interior mixing chamber 6 and hot and cold water supply ports 7 and 8, respectively, arranged at diametrically opposite sides of the casing and having valve seats 9 and 10 at their points of junction with the mixing chamber 6. The wall 11 of the casing is provided with the outlet port 12 formed with a boss 13 interiorly thereof. Diametrically opposite the outlet port 12 is a substantially larger opening 14 and formed therearound is an exteriorly screw-threaded lip 15. Screw-threadedly engaged with the lip 15 is a control bonnet 16 formed with an exteriorly screw-threaded shank 17 upon which is screw-threadedly secured a packing nut 18. The shank 17 of the control bonnet 16 screw-threadedly receives the valve stem 19 which is formed with external helical threads having an essentially steep pitch, which shank extends interiorly thereof within the mixing chamber 6 and terminates adjacent the outlet port 12. A rubber washer 20, or the like, is secured to the inwardly extending end of the valve stem and bears against the boss 13 of the discharge passage 12, forming a means whereby the said passage may be effectively opened or closed. The screw-threaded portion of the valve stem 19 terminates in an outwardly extending shank 21 which terminates exteriorly of the packing nut 18. Interiorly of the nut 18 is provided a rubber washer 22 and packing material 23 to effectively seal the same. Bolted or otherwise secured to the exteriorly projecting shank 21 is a control handle 24 which is provided with an inner recess 25 to substantially enclose but not engage the packing nut 18. Formed on the valve stem 19 interiorly of the mixing chamber 6 and in axial alignment with the hot and cold water supply ports 7 and 8 is an eccentric 26. Brackets 27 and 28 are positioned interiorly of the mixing chamber 6 and are provided with holes 29 and 30, respectively, in axial alignment with the supply ports 7 and 8 and act as bearings for the water control valves 31 and 32. The inner ends of the valves 31 and 32 bear against the cam surface of the eccentric 26 and the outer ends thereof are provided with rubber tips 33 and 34 which coact with the valve seats 9 and 10 to effectively stopper the same. The control handle 24 is provided on its exterior surface with appropriately arranged labels 40 indicating the temperature of water that may be obtained from various positions of the handle and cooperating therewith to indicate the temperature of the mixed liquid is a pointer 35.

The operation of my device is as follows:

When the control handle 24 is turned to the "off" position, the valve stem 19 positioned in the screw-threaded shank 17 of the bonnet 16 will be in the innermost position and with the rubber washer 20 on its opposite end thereof bearing against the boss 13 of the outlet opening 12 to effectively close the same. In this position the eccentric 26 will hold the rubber tip 33 of the valve 31 tightly pressed against the valve seat 9 of the hot water inlet 7. The opposite side of the eccentric 26 will permit the water pressure in the cold water inlet pipe to force the valve 32 inwardly and to permit the flooding of the mixing chamber 6 with cold water. The cold water within the chamber will not be permitted to escape therefrom due to the closure of the outlet port 12 by the rubber washer 20. When the control handle 24 is turned slightly to the left, the valve stem 19 will be rotated rearwardly within the bonnet 16 opening the outlet passage 12. The eccentric 26 will have rotated slightly but not sufficiently to permit the opening of the valve 31 in the hot water port 7. However, cold water may now pass through the cold water entrance port 8 and out through the discharge port 12. It will at once be seen that the water pressure from the supply pipe will hold the valve 32 open until it is closed by sufficient rotation of the control handle 24. As the control handle is rotated farther to the left, the valve stem 19 will be backed farther away from the discharge port 12 and the cam 26 formed thereon will have rotated sufficiently to permit the water pressure in the hot water entrance port to force the valve 31 away from the valve seat 9 thereby permitting a trickle of hot water to enter the mixing chamber 6. The water issuing from the discharge port 12 will now be tepid. It can at once be seen that as the control handle 24 moves farther and farther to the left, increasingly great amounts of hot water will be obtained through the discharge port 12, and that as the eccentric 26 is rotated, the cam surface will force the cold water valve 32 in the direction of the valve seat 10 of the cold water entrance port 8. After the handle 24 has been rotated 180° so that the label "hot" is directly under the pointer 35, the eccentric 26 will have been rotated sufficiently to force the rubber tip 34 on the valve 32 into tight-pressed engagement with the valve seat 10 of the cold water entrance port, and the valve 31 will then be held in the open position due to the shape of the eccentric 26 and the water pressure in the hot water entrance port 7. In this position the valve stem 19 has been backed to the farthermost position and a half turn of 180° to the right is all that is necessary to rotate the same to the innermost position and bring the rubber washer 20 on its inner end into engagement with the boss 13 of the discharge port 12 to effectively stopper the same.

It is to be understood that the form of my invention herewith shown and described is to be taken as a preferred example and that various changes in the size, shape and arrangement of parts may be resorted to without departing from the spirit of my invention or the scope of the appended claim.

Having thus described my invention, I claim:

A mixing valve comprising a valve casing having a mixing chamber therein, oppositely disposed hot and cold water inlet ports in the sides thereof, and an outlet port in one end, all of said ports being provided with valve seats which open directly into the mixing chamber; a valve stem formed with external helical threads having an essentially steep pitch screw-threadedly received in the end of the casing opposite the said outlet port, and having its inner end adapted to normally close the outlet; an eccentric formed on the said valve stem and having an essentially wide peripheral surface; sleeves secured to said casing interiorly thereof and in abridging relation to the said water ports; plunger valves entirely accommodated within the mixing chamber and slidably mounted within the sleeves for movement into and out of engagement with the valve seats, water pressure exteriorly of the mixing chamber acting on the plunger valves to at all times hold the same in engagement with the said wide peripheral surface of the eccentric, and the said eccentric cooperating with the said plunger valves in a manner whereby one of the said valves will be seated to close its respective water port and the other of the valves will be unseated to open its respective water port when the inner end of the stem is seated against the outlet port to close the same, the portion of the valve stem exteriorly of the casing being formed to permit manual rotation thereof to move the same rapidly axially away from the said outlet port to fully open the same and to simultaneously rotate the said eccentric to slidably actuate both of the said plunger valves within their supporting sleeves to open the said closed water port and to close the said open water port to regulate the temperature of the water within the mixing chamber.

ALFRED WAYNE FELGER.